United States Patent [19]

Mekawi et al.

[11] Patent Number: 5,440,415
[45] Date of Patent: Aug. 8, 1995

[54] OPTICAL SUCCESSIVE MODULATION-MULIPLEXING FOR FIBER OPTICAL NETWORK

[75] Inventors: Mohamed M. Mekawi, Denville; Yan-Chi Shi, Whippany, both of N.J.

[73] Assignee: AT&T Corp., Murray Hill, N.J.

[21] Appl. No.: 101,881

[22] Filed: Aug. 4, 1993

[51] Int. Cl.$^6$ .............................................. H04J 14/02
[52] U.S. Cl. .................................... 359/126; 359/182
[58] Field of Search ............... 359/113, 132, 136, 143, 359/152, 174, 176, 179, 182, 126; 370/93

[56] References Cited

U.S. PATENT DOCUMENTS

| | | | |
|---|---|---|---|
| 4,715,028 | 12/1987 | McMahon et al. | 359/126 |
| 4,742,576 | 5/1988 | McMahon | 359/126 |
| 5,083,874 | 1/1992 | Aida et al. | 359/174 |

FOREIGN PATENT DOCUMENTS

| | | | |
|---|---|---|---|
| 0227362 | 7/1987 | European Pat. Off. | 359/126 |
| 2019561 | 10/1979 | United Kingdom | 359/126 |

OTHER PUBLICATIONS

Benedetto et al. "Analysis of an Optical Code Division Multiple Access Scheme Employing Gold Sequences" IEE Proceedings-I, vol. 140, No. 3, Jun. 1993, pp. 211–219.

"Subcarrier Multiplexing for Multiple-Access Lightwave Networks," by Darcie, *Journal of Lightwave Technology*, vol. LT-5, No. 8, p. 1103, Aug., 1987.

"Clipping Distortion in Subcarrier-Multiplexed CATV Systems," by Frigo, et al., OFC'92, *Tuesday Morning*, p. 20.

"Lighwave Systems With Optical Amplifiers," by Olsson, *Journal of Lightwave Technology*, vol. 7, No. 7, p. 1071, Jul., 1989.

"Intermodulation Effects in Limiter Amplifier Repeaters," by Bond, et al., *IEEE Transactions on Communication Technology*, vol. Com-18, No. 2, p. 127, Apr., 1970.

"Fast Automatic Polarization Control System," by Heismann, et al., *IEEE Photonics Technology Letters*, vol. 4, No. 5, p. 503, May, 1992.

"Fundamental Limit on Number of Channels in Subcarrier-Multiplexed Lightwave CATV System," by Saleh, *Electronics Letters*, 8th Jun. 1989, vol. 25, No. 12, p. 776.

"Transient Gain and Cross Talk in Erbium-Doped Fiber Amplifiers," by Giles, et al., *Optics Letters*, vol. 14, No. 16, p. 880, Aug. 15, 1989.

"Multichannel Crosstalk and Pump Noise Characterisation of $Er^{3+}$-Doped Fibre Amplifier Pumped at 980 nm," by Laming, et al., *Electronics Letters*, 30th Mar. 1989, vol. 25, No. 7, p. 455.

(List continued on next page.)

*Primary Examiner*—Herbert Goldstein
*Assistant Examiner*—Kinfe-Michael Negash

[57] ABSTRACT

A multiple-access network communication system employs a single continuous-wave optical carrier which is successively modulated and multiplexed at a plurality of data access nodes. The data access nodes are cascaded along an optical propagation path, and at each such node, the optical carrier is impressed with an modulated electrical signal which corresponds to an electrical subcarrier having a subcarrier frequency which is uniquely responsive to its associated data access node. Local data at each such node is modulated electrically in accordance with a known modulation scheme, such as FSK modulation, the resulting modulated subcarrier being conducted to a respective optical modulator which impresses same upon the optical carrier. The optical carrier is periodically, with respect to the data access nodes, amplified by an optical amplifier, and ultimately conducted to a receiver where the optical carrier is detected and converted to a corresponding electrical signal. The electrical signal is then demultiplexed, illustratively by filters tuned to the subcarrier frequencies, each of which is then demodulated, whereby the original data signal is recovered. The invention can be implemented in bidirectional embodiments which permit modulated optical carrier to be propagated in opposite directions. In addition, a bidirectional embodiment can be provided with both optical carriers from a single laser source.

22 Claims, 5 Drawing Sheets

OTHER PUBLICATIONS

"Twenty Channel FSK Subcarrier Multiplexed Optical Communication System for Video Distribution," by Hill, et al., *Electronics Letters*, 7th Jul. 1988, vol. 24, No. 14, p. 892.

"Modeling of Gain in Erbium-Doped Fiber Amplifiers," by Saleh, *IEEE Photonics Technology Letters*, vol. 2, No. 10, p. 714, Oct., 1990.

"Microwave-Multiplexed Wideband Lightwave Systems Using Optical Amplifiers for Subscriber Distribution," by Olshansky, et al., *Electronic Letters*, 21st Jul. 1988, vol. 24, No. 15, p. 922.

300

500

OPTICAL SUCCESSIVE MODULATION-MULIPLEXING FOR FIBER OPTICAL NETWORK

BACKGROUND OF THE INVENTION

1. Field of the Invention

This invention relates generally to systems for transmitting data along optical paths, and more particularly, to a multiple access network wherein a single, continuous-wave optical carrier which propagates through fiber optic cable is successively modulated at plural data access nodes by respective optical modulator stages in response to respectively associated local data streams.

2. Description of the Related Art

Known multiplexing multiple-access communication networks are complicated and expensive to build and operate. One typical system is shown in FIG. 1, and is of the multiplexing regenerator type wherein the optical carrier is regenerated at each node. As shown in FIG. 1, this known system employs multiplexer/regenerator nodes 10 through 13, at each of which digital data from multiple sensors (not shown) is supplied to a multiplexer which conducts the multiplexed digital data to a regenerator. Each regenerator receives, in this known arrangement, an optical signal which is converted to an electrical signal. The electrical signal is then multiplexed with the electrical multiplexed data from the multiplexer. The electrical signal having the combined information is convened to an optical signal and transmitted by an optical fiber to the next successive regenerator.

There is clearly a need for a system which eliminates the optical/electrical and electrical/optical conversions as prerequisites to the multiplexing of node data. Each such conversion, in addition to requiring the use of expensive and complex hardware, also requires significant consumption of electrical energy, thereby requiring a high capacity electrical conductor to be provided in conjunction with the optical fiber for remote sensing. The high supply voltages complicates the cable design.

It is, therefore, an object of this invention to provide a multiple-access communications network which propagates a single, continuous-wave optical carrier which is successively modulated without the need for electrical/optical conversion at each access node of the network.

It is another object of this invention to provide a multiple-access communications system wherein the expense of optical carrier regeneration is avoided.

It is also an object of this invention to provide a multiple-access communications system which affords a significant improvement in overall data throughput over that afforded by time-division multiplexing (TDM) arrangements.

It is a further object of this invention to provide a multiple-access communications system which reduces expense, power consumption, and complexity by eliminating the need for a full complement of regenerator functions at each location, as required in known systems which multiplex local data.

It is additionally an object of this invention to provide a multiple-access communications system which achieves high reliability and survivability, and which is tolerant of node failure.

It is also another object of this invention to provide a multiple-access communications system which can be driven by a single laser source.

It is yet an additional object of this invention to provide a multiple-access communications system which has the capacity to support hundreds of nodes.

It is still another object of this invention to provide a multiple-access communications system wherein power consumption is reduced by performing all modulation in the optical domain.

It is also a further object of this invention to provide a multiple-access communications system.

SUMMARY OF THE INVENTION

The foregoing and other objects are achieved by this invention which provides, in an apparatus aspect thereof, a multiple-access network communication system of the type which employs a single source of continuous-wave optical carrier. In accordance with the invention, a plurality of data access nodes modulate the carrier, each in response to a respectively associated data stream. Each of the data access nodes has a respectively associated modulated electrical subcarrier with a unique subcarrier frequency. At each of the data access nodes an optical modulator then modulates the optical carrier in response to the modulated electrical signal of the data associated with the access node. The optical carrier is propagated through the data access nodes, which are coupled to one another and to the receiver by an arrangement, such as optical fiber, which propagates the continuous-wave electromagnetic energy from its source to successive ones of the plurality of the data access nodes and to the receiver.

In one embodiment of the invention, there are provided at the receiver a plurality of electrical filters, each of which is tuned, and is responsive to a respective one of the subcarrier frequencies. Each such filter isolates a respective modulated subcarrier. At each data access node, an electrical modulator is provided for encoding a respective electrical subcarrier in response to a local data stream. A corresponding demodulator is coupled to each of the filters for decoding a respective modulated subcarrier frequency.

Each data access node is provided with an optical modulator which impresses upon the single continuous-wave optical carrier an amplitude modulation characteristic which corresponds to the local modulated electrical subcarrier. In some embodiments of the invention, an optical amplifier is provided for amplifying the modulated optical carrier. In embodiments of the invention where a large number of successive data access nodes are provided, an optical amplifier may be provided periodically after every k numbers of data access nodes.

In accordance with a first method aspect of the invention, a single continuous-wave optical carrier is modulated at a plurality of successive locations along a propagation path. This method aspect of the invention includes the steps of:

installing an optical modulator at each of the plurality of locations along the propagation path of the continuous-wave optical carrier; and modulating the single continuous-wave optical carrier at each of the plurality of locations at a respective, different subcarrier frequency.

In some embodiments of this method aspect of the invention, there is provided the step of data modulating a respective electrical subcarrier having a respective subcarrier frequency associated with one of the optical modulators, prior to performing the step of carrier modulating. In some embodiments, the step of modulating comprises the step of FSK (Frequency-Shift-Keying) data modulating the respective subcarrier at the respective subcarrier frequency.

In accordance with a still further embodiment of the invention, this first method aspect of the invention is further provided with the step of detecting the modulated signal continuous-wave optical carrier and the step of isolating each electrical subcarrier. In some embodiments, the step of isolating each electrical subcarrier includes the step of filtering the electrical subcarriers using filters which are respectively responsive to the various subcarrier frequencies. Each isolated subcarrier is then subjected to electrical demodulation in accordance with any of several known electrical demodulation schemes, such as FSK demodulation.

In a further method aspect of the invention there is provided a communication between 1 through n communication stations and a receiving station. This further method aspect includes the steps of:

optically interconnecting the 1 through n communication stations and the receiving station, whereby a single continuous-wave optical carrier is propagated successively through the 1 through n communication stations, and to the receiving station; and modulating the single continuous-wave optical carrier successively at each of the 1 through n communication stations at a respectively associated one of 1 through n different subcarrier frequencies.

In one embodiment of this further method aspect of the invention, there is provided the further step of amplifying the modulated single continuous-wave optical carrier. Such amplification is performed periodically every k communication stations, where k<n.

In accordance with a further embodiment of this further method aspect of the invention, there is provided the step of isolating each of the 1 through n electrical subcarrier frequencies. Data is then extracted from the electrical subcarriers at respective 1 through n subcarrier frequencies. During performance of the step of carrier modulating, there is provided the step of data modulating at least selected ones of the 1 through n subcarrier frequencies with a respectively associated one of 1 through n data streams associated with respective ones of the 1 through n communication stations. As previously indicated, the extraction of data includes the further step of demodulating the selected ones of the 1 through n data streams employing a known electrical demodulation scheme, such as FSK demodulation.

BRIEF DESCRIPTION OF THE DRAWING

Comprehension of the invention is facilitated by reading the following detailed description, in conjunction with the annexed drawing, in which.

DETAILED DESCRIPTION

Figure 1:
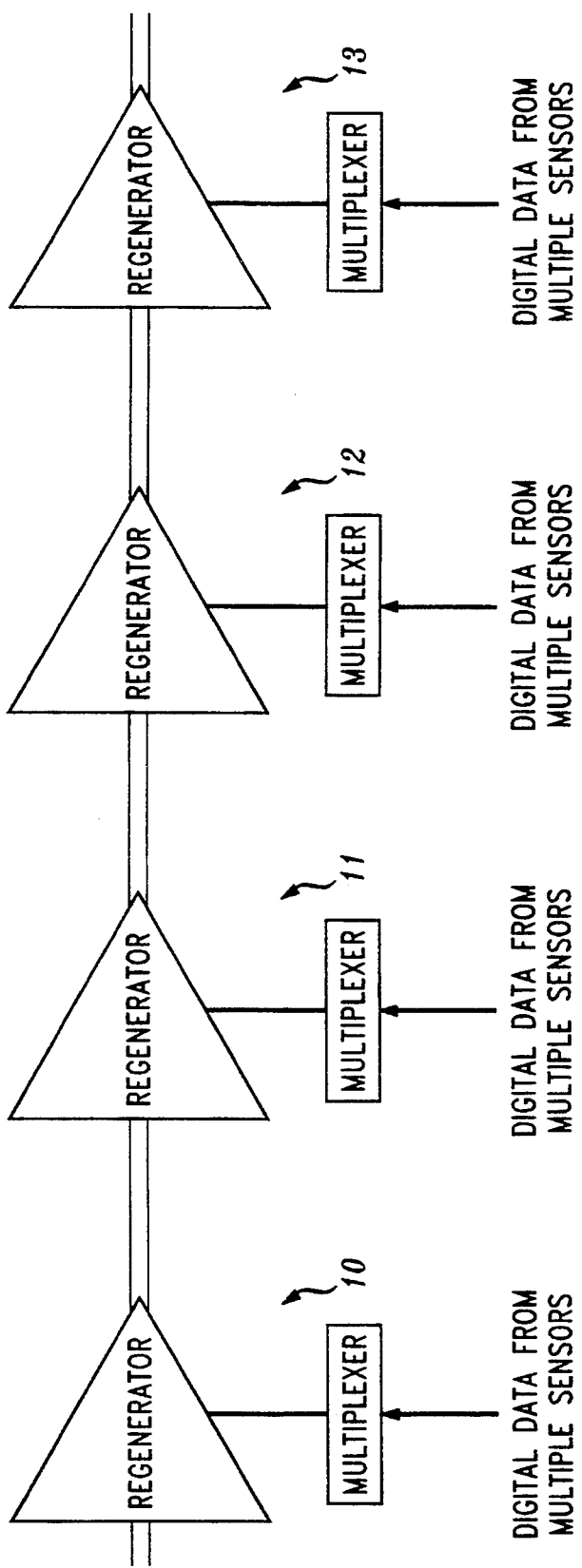
FIG. 1 is a schematic representation of a known successive multiplexing arrangement which regenerates the optical carrier at each data access node.
Figure 2:
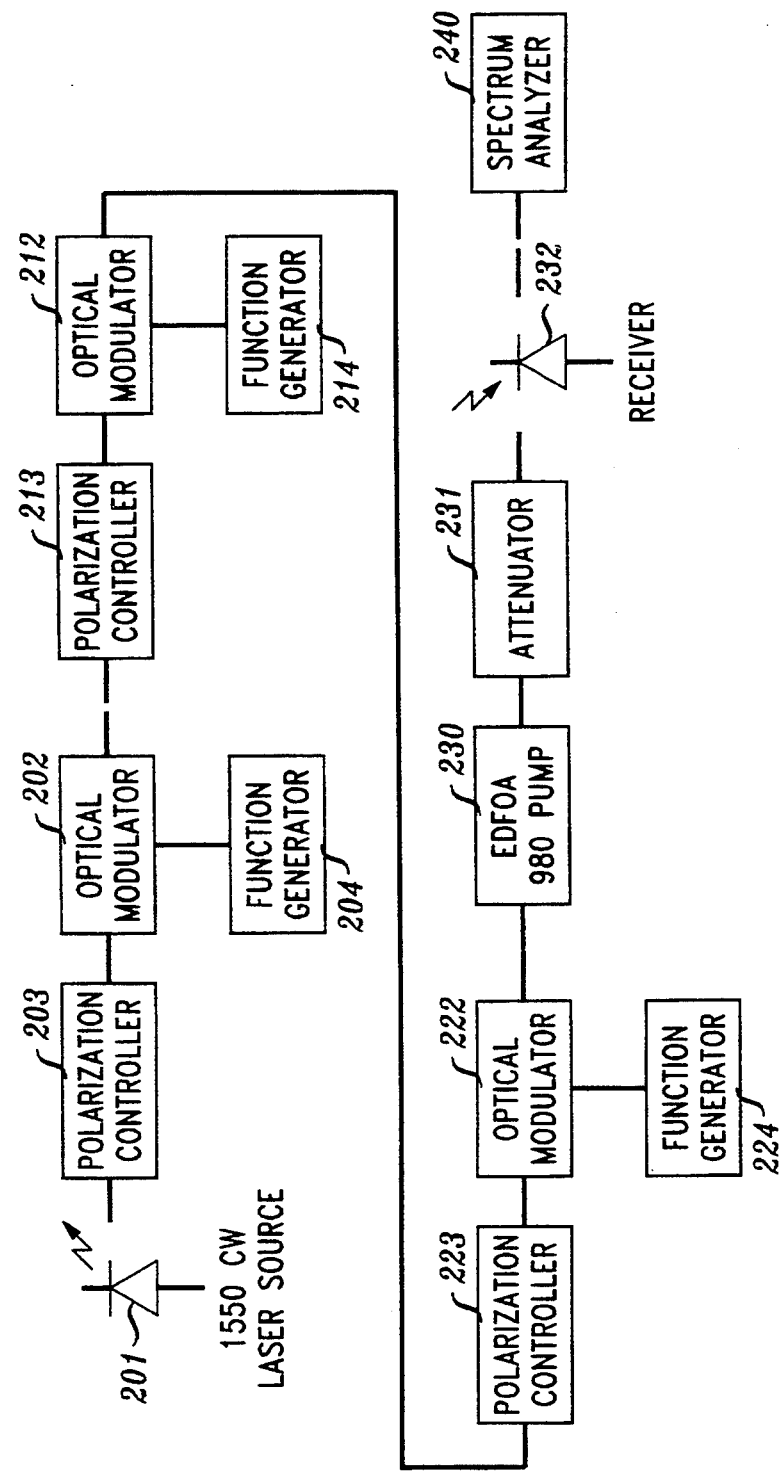
FIG. 2 is a schematic representation of an experimental arrangement used by the inventors herein to establish the feasibility of a successive modulation arrangement which operates directly on an optical carrier and does not require regeneration of the optical carder at the data access nodes.

FIG. 2 is a function block representation of an experimental arrangement which is useful to illustrate the successive modulation and multiplexing aspects of the invention. As shown in this figure, experimental communication system 200 is provided with a laser source 201 which issues a continuous-wave optical carrier operating at approximately 1550 rim. In the experimental set-up shown in this figure, three communication nodes are cascaded on an optical path. A first such node is formed of an optical modulator 202 which, in this embodiment of the invention, is a Mach-Zehnder type optical modulator. Since Mach-Zehnder modulators are polarization-dependent, a polarization controller 203 is provided. Optical modulator 202 modulates the optical carrier issued by laser source 201 in response to an electrical signal provided by function generator 204.

The second communication node employs optical modulator 212 with its associated polarization controller 213. Optical modulator 212 modulates the optical carrier in response to an electrical signal generated by function generator 214. The third communication node is comprised of optical modulator 222 with associated polarization controller 223. The optical carrier is modulated in response to the electrical signal produced by function generator 224. Thus, the experimental arrangement uses three cascaded Mach-Zehnder modulators with respectively associated polarization controllers for aligning the signal polarization. The same optical carrier is successively modulated by the cascaded optical modulators, without requiring conversion between the optical and electrical domains. However, the signals generated by the function generators are electrical in nature.

System gain is achieved by an optical amplifier 230, known as an Erbium-Doped Fiber Optical Amplifier (EDFOA). Optical amplifier 230, in this specific illustrative embodiment of the invention, employs a 9.5 m Er+ doped fiber and a pump laser is employed in the optical amplifier. The particular pump laser used in the experimental arrangement is formed of a Seastar PT450980HX 980 nm dime. Any excess gain was taken up by an attenuator 231.

Each optical modulator is driven by a single tone, operating close to its inflection point. Attenuator 231 is adjusted such that the same input signal power to a receiver 232, with and without amplifier 230, is maintained. Receiver 232 converts the optical carrier to a complex electrical signal which is, in the experimental arrangement, conducted to a spectrum analyzer 240. Thus, the three tones generated by function generators 204, 214, and 224 are recovered and displayed on the spectrum analyzer.

Experimental arrangement 200 generated measurable second and third order successive modulation distortion (SMD) terms which corresponded to computed values. In addition, the amplifier noise, which is much higher than the receiver noise, was experimentally determined to be in conformance with expected results, and permitted acceptable carrier-to-noise ratio (CNR). From this arrangement, therefore, the feasibility of the inventive concept is established.

Figure 3:
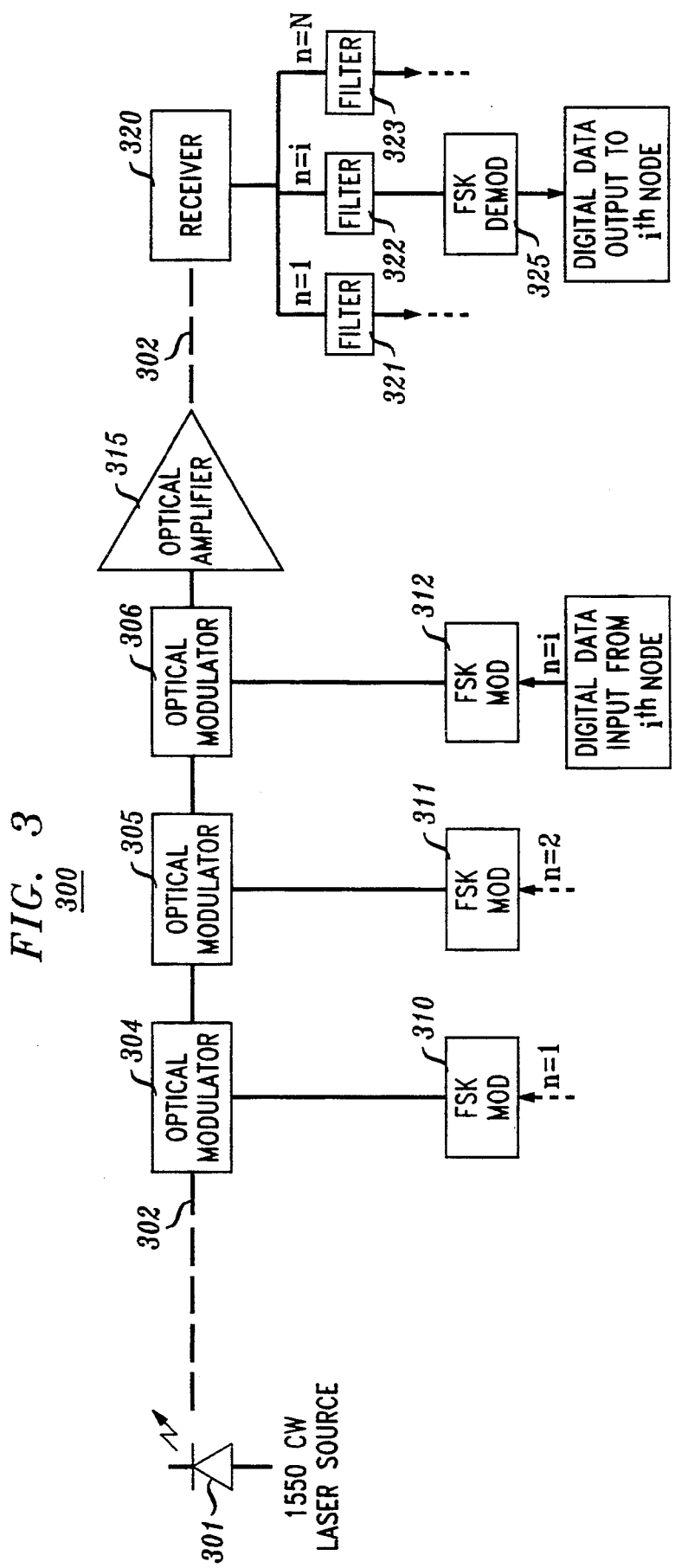
FIG. 3 is a schematic representation of a successive modulation-multiplexing scheme constructed in accordance with the principles of the invention.

FIG. 3 is a function block and partially schematic representation of a specific illustrative embodiment of the invention, in the form of a successive modulation-multiplexing scheme 300. As shown, a laser source 301 issues an optical carrier (not shown) which is propagated along a fiber optic path 302 and through a plurality of cascaded polarization-insensitive optical modulators 304, 305, and 306. Each of the optical modulators impresses upon the optical carrier propagating along fiber optic path 302 a respective amplitude modulation which is responsive to an associated one of electrical FSK modulators 310, 311, and 312. Each such FSK modulator receives a respective digital data input from a respective source (not shown). Each of the FSK modulators utilizes an electrical subcarrier which has a respective, unique subcarrier frequency. Thus, successive modulation of the optical carrier is achieved at different subcarrier frequencies, each such frequency being uniquely associated with a data source (not shown).

Each of the optical modulators may have an attenuating, or loss, effect on the optical carrier. Accordingly, the amplitude of the optical carrier is amplified by an optical amplifier 315. In a practical embodiment of the invention, it is contemplated that an optical amplifier, such as optical amplifier 315, will be arranged in the fiber optic path after each k cascaded optical modulators (i.e., nodes). In a specific illustrative embodiment of the invention, such as where the optical modulators are of the Mach-Zehnder type, an optical amplifier is arranged to follow four cascaded optical modulators.

The modulated optical carrier is detected at a receiver 320, where an optical-electrical conversion is performed. The resulting, equivalent electrical signal is subjected to a plurality of filters 321, 322, and 323, which are tuned to respectively associated ones of the subcarrier frequencies. The resulting electrical subcarrier from each of the filters is then subjected to FSK demodulation at a respective FSK demodulator, such as FSK demodulator 325. The figure illustrates how data from the $i^{th}$ data input node is extracted as data output at the output of FSK demodulator 325.

This invention is primarily suited for data transport networks, e.g., data collection for remote data acquisition systems such as undersea surveillance networks. However, it can readily be used in loop applications such as an add/drop multiplexer.

Figure 4:
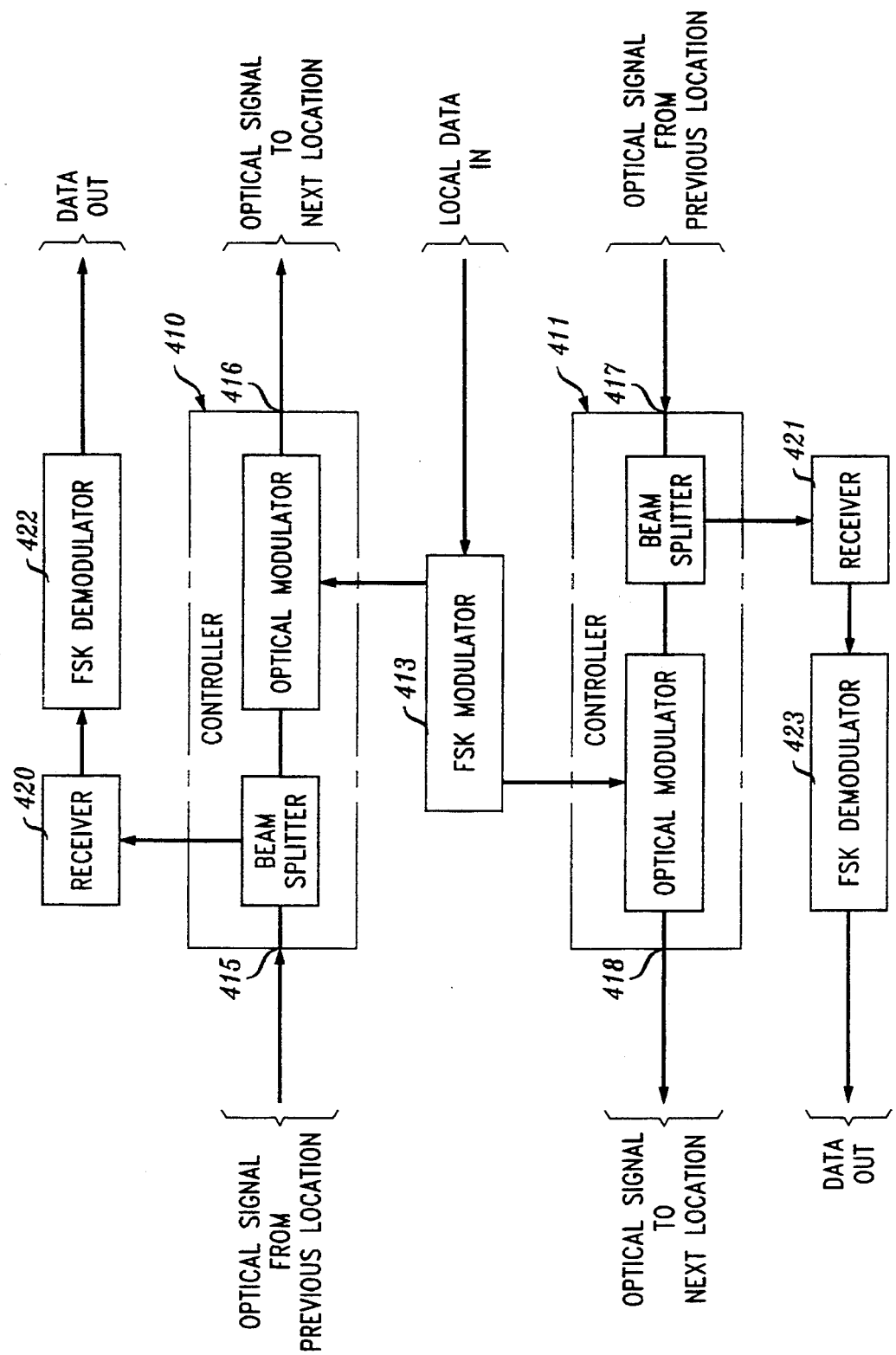
FIG. 4 is a schematic representation of a node arrangement for a bidirectional successive modulation-multiplexing loop network.

FIG. 4 is a function block representation of a bidirectional node arrangement 400 which can be used in a successive modulation-multiplexing loop application. As shown, the bidirectional node arrangement is provided with a first controller 410 which consists of a beam splitter and a polarization-insensitive optical modulator, and a second such controller 411, each of which is arranged to propagate a respective optical carrier (not specifically shown), in opposite directions. Each of the controllers, however, modulates its associated optical carrier in response to electrical data which is provided to an FSK modulator 413. It is to be understood, however, that the invention is not limited to FSK modulation arrangements, and other electrical modulation arrangements can be employed.

Each of the controllers is arranged as one of a plurality of successive such controllers (not shown in this figure) on the respective optical carrier paths. Controller 410 receives the optical signal from a previous location (not shown in this figure) at an input 415, and propagates the optical signal to the next location at an output 416. In similar manner, controller 411 receives its optical signal from a previous location at an input 417, and propagates the optical signal to the next location at an output 418 thereof.

In each of the controllers, the optical signal is detected in a respectively associated one of receivers 420 and 421, and the electrical signal is demodulated, illustratively at a respectively associated one of FSK demodulators 422 and 423. Thus, each node location can receive data from any other node location, so long as the receiver isolates the desired subcarrier.

Figure 5:
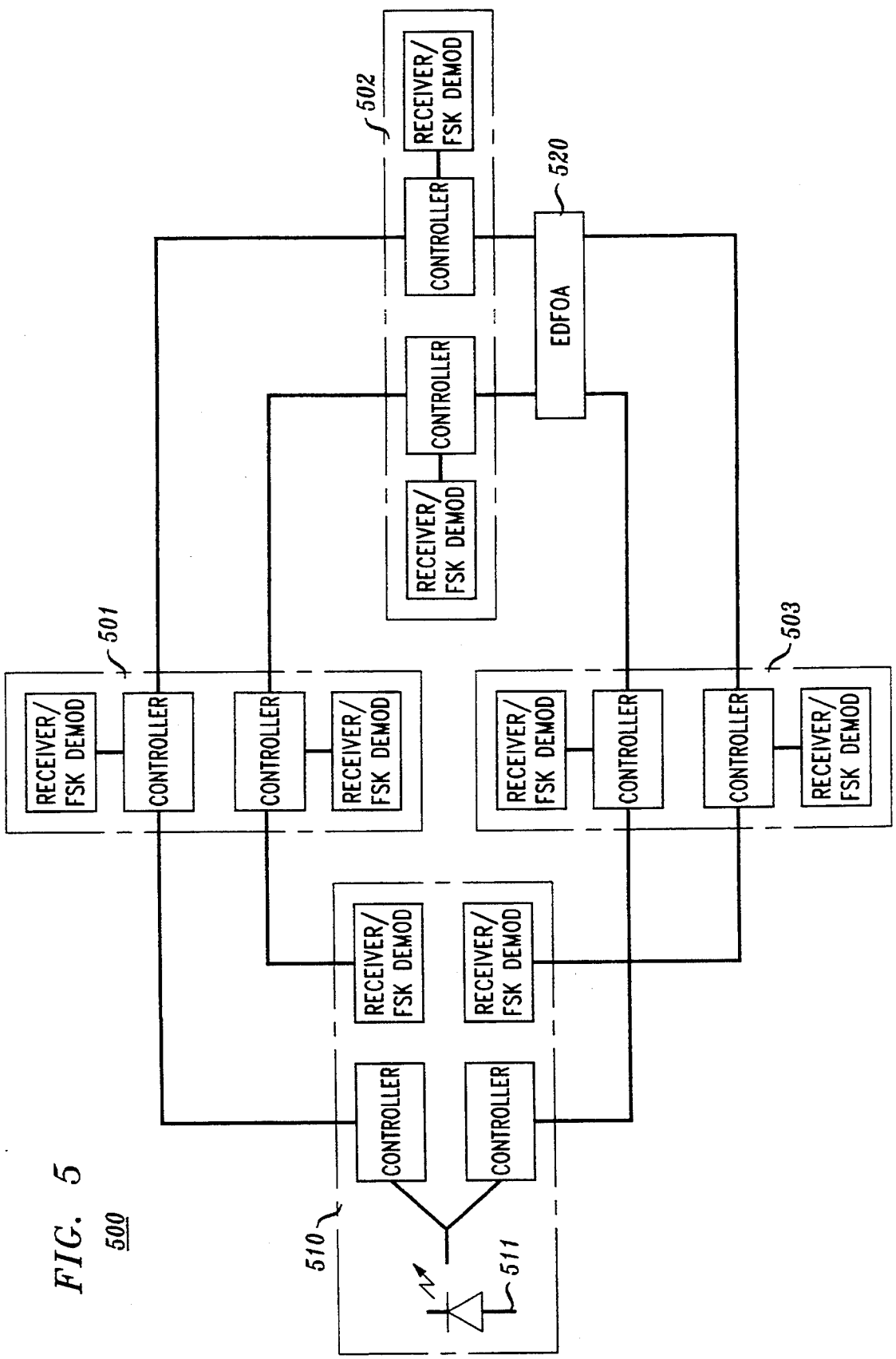
FIG. 5 is a schematic representation of a successive modulation-multiplexing bidirectional loop network.

FIG. 5 is a partially schematic representation of the architecture of a bidirectional successive modulation-multiplexer loop 500. As shown, bidirectional loop 500 is provided with a plurality of bidirectional node arrangements 50 1,502, and 503, which may be similar to that described hereinabove with respect to FIG. 4. There is additionally shown in FIG. 5 a master node 510 which is provided with a laser source 511 which provides an optical carrier (not specifically shown) in each direction of the bidirectional loop. An optional optical amplifier 520 is provided in the bidirectional loop, and in this embodiment, the amplifier may be of the Er+ doped fiber optic amplifier (EDFOA) type. Thus, the embodiment of the invention shown in this figure achieves bidirectionality using only a single laser source.

Although the invention has been described in terms of specific embodiments and applications, persons skilled in the an can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A multiple-access network communication system of the type which employs continuous-wave electromagnetic energy as a carrier, the multiple-access network communication system comprising:

a single source of continuous-wave electromagnetic energy for forming the carrier;

conduit means for defining a carrier path along which the carrier is propagated;

a plurality of data access nodes arranged sequentially along said carrier path for accessing the carrier, each of said plurality of data access nodes having associated therewith a respective:

splitter means for dividing the carrier into first and second carrier portions, said first portion of the carrier being propagated along said carrier path and said second portion being extracted from said carrier path;

modulator means for modulating said first portion of the carrier in response to a respectively associated data stream, each of said modulator means in said plurality of data access nodes having a respectively associated subcarrier frequency; and receiver means for detecting said second portion of the carrier modulated in response to said data streams associated with others of said plurality of data access nodes; and optical coupling means for coupling said single source of continuous-wave electromagnetic energy to said conduit means, whereby the carrier is propagated through said splitter means and said modulator means associated with each of said plurality of data access nodes along said carrier path.

2. The multiple-access optical network communication system of claim 1 wherein at least one of said data access nodes is further provided with an electrical filter means coupled to said receiver means and responsive to a respective one of said subcarrier frequencies.

3. The multiple-access optical network communication system of claim 2 wherein there is further provided:
a plurality of modulator means coupled to respective ones of said data access nodes for encoding a respective one of the subcarriers in response to a respective one of the data streams; and
a plurality of demodulator means coupled to respective ones of said filter means, each for decoding a respective modulated subcarrier.

4. The multiple-access optical network communication system of claim 1 wherein there is further provided optical modulator means arranged at each data access node for impressing a respective modulated subcarrier on the carrier.

5. The multiple-access optical network communication system of claim 1 wherein there is further provided optical amplifier means for amplifying the modulated carrier.

6. The multiple-access optical network communication system of claim 5 wherein there is provided an optical amplifier means for every four data access nodes.

7. A method of modulating a single continuous-wave optical carrier at a plurality of locations along a propagation path, the method comprising the steps of:
installing an optical modulator at each of the plurality of locations along the propagation path of the continuous-wave optical carrier;
carrier receiving at each of the plurality of locations by detecting at least a portion of the single continuous-wave Optical carrier; and
carrier modulating the single continuous-wave optical carrier at each of the plurality of locations at a respective, different subcarrier frequency.

8. The method of claim 7 wherein prior to performing said step of carrier modulating, there is provided the step of data modulating a respective electrical subcarrier having a respective subcarrier frequency associated with one of the optical modulators.

9. The method of claim 8 wherein said step of data modulating comprises the step of FSK data modulating the respective subcarrier at the respective subcarrier frequency.

10. The method of claim 8 wherein there is provided the further step of isolating each electrical subcarrier.

11. The method of claim 10 wherein said step of isolating each electrical subcarrier comprises the step of filtering the electrical subcarriers using filters which are respectively responsive to the various subcarrier frequencies.

12. The method of claim 11 wherein there is further provided the step of demodulating electrically each isolated subcarrier.

13. The method of claim 12 wherein said step of demodulating electrically comprises the step of FSK demodulating.

14. A method of communication between 1 through n communication stations and a receiving station, the method comprising the steps of:
optically interconnecting the 1 through n communication stations and the receiving station for forming an optical path through which a single continuous-wave optical carrier is propagated successively through the 1 through n communication stations and to the receiving station;
carrier modulating the single continuous-wave optical carrier successively at each of the 1 through n communication stations at a respectively associated one of 1 through n different subcarrier frequencies; and
carrier receiving at at least one of said 1 through n communication stations by detecting at least a portion of the single continuous-wave optical carrier.

15. The method of claim 14 wherein there is further provided the step of amplifying the modulated single continuous-wave optical carrier.

16. The method of claim 15 wherein said step of amplifying is performed periodically after every k communications stations, where $k < n$.

17. The method of claim 14 wherein there is further provided the step of isolating each of said 1 through n electrical subcarrier frequencies.

18. The method of claim 17 wherein there is further provided the step of extracting data from said electrical subcarriers at respective 1 through n subcarrier frequencies.

19. The method of claim 18 wherein during performance of said step of carrier modulating, there is provided the step of data modulating at least selected ones of the 1 through n subcarrier frequencies with a respectively associated one of 1 through n data streams associated with respective ones of the 1 through n communication stations.

20. The method of claim 19 wherein said step of extracting data comprises the further step of demodulating said selected ones of the 1 through n data streams employing a FSK demodulation scheme.

21. A bidirectional multiple-access network communication system comprising:
a single source of continuous-wave electromagnetic energy for forming first and second optical carriers;
a plurality of data access nodes for modulating the first and second optical carriers in response to a respectively associated data stream, each of said plurality of data access nodes having a respectively associated modulated subcarrier having a respective subcarrier frequency;
first and second receiver means for detecting the first and second optical carriers, respectively, each being modulated in response to said respectively associated data streams at said respective subcarrier frequencies associated with said data access nodes; and
first and second optical coupling means for propagating respectively the first and second optical carriers, the first and second optical carriers being propagated through said plurality of data access nodes to said first and second receiver means in opposite directions in respective ones of said first and second optical coupling means.

22. The bidirectional multiple-access network communications system of claim 21 wherein said first and second receiver means produce respective first and second electrical data signals corresponding to the first and second optical carriers, respectively.

* * * * *